Nov. 20, 1962 P. PIERCE, JR 3,064,505
POSITIONING TABLE
Filed Aug. 4, 1961 2 Sheets-Sheet 2
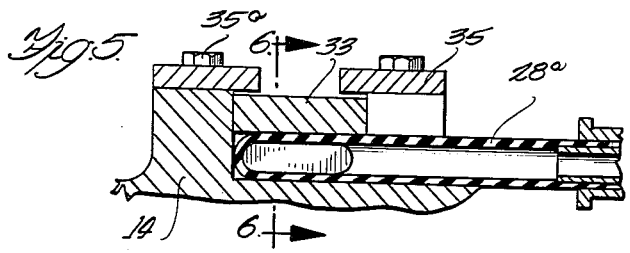
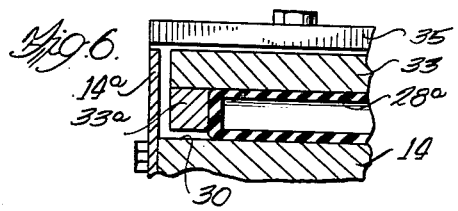
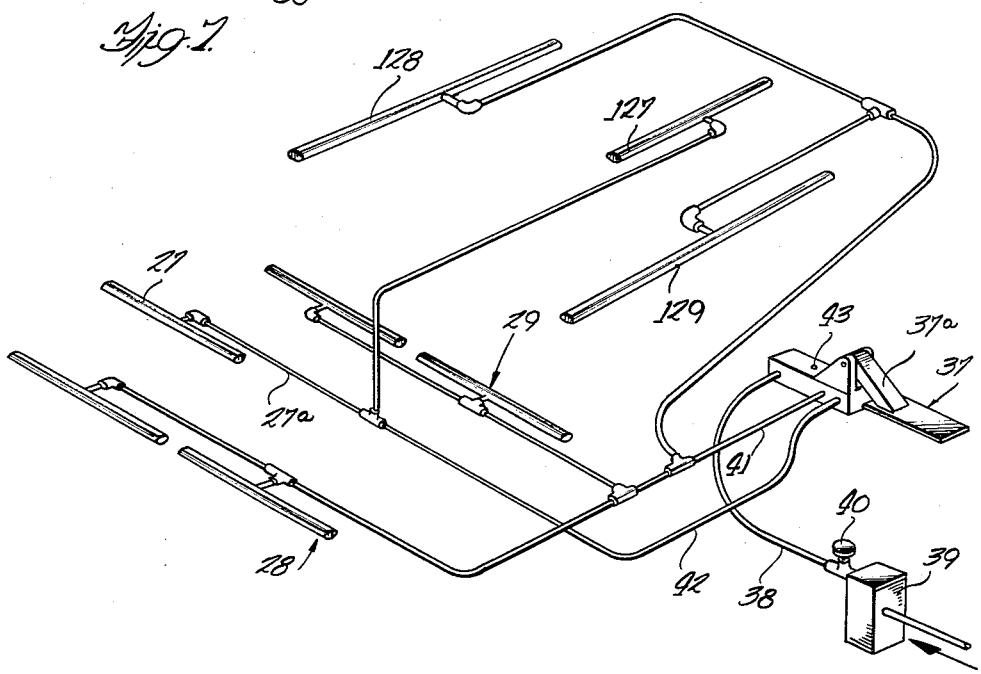
Inventor
Paul Pierce, Jr.
Dawson, Tilton, Fallon & Lungmus
Attorneys

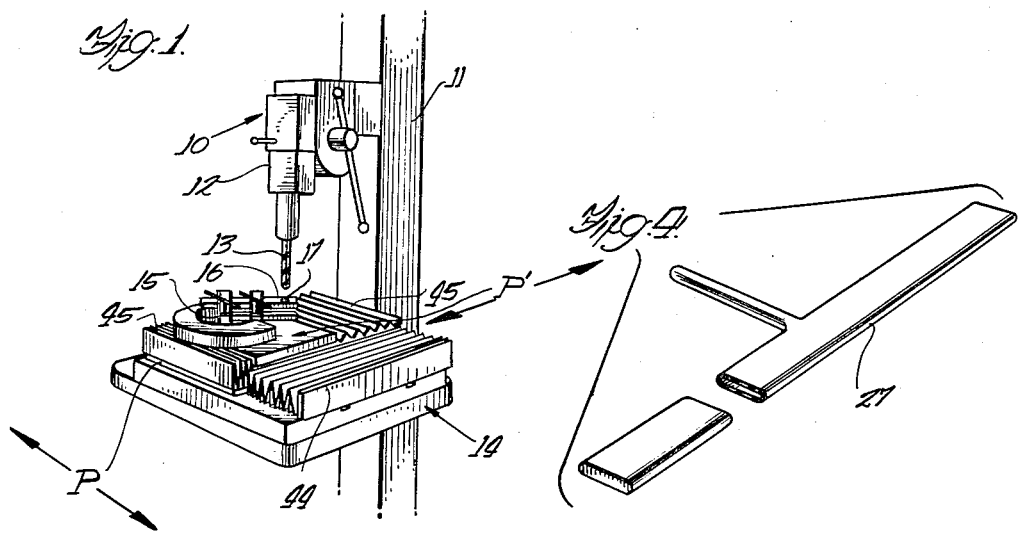
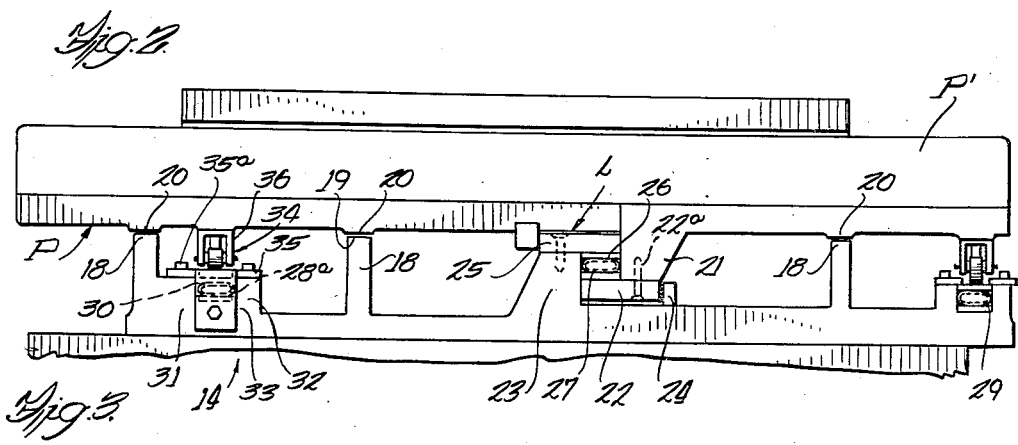
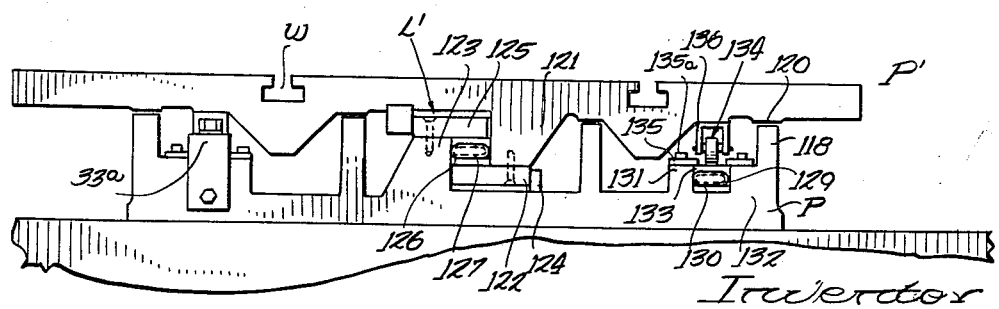

United States Patent Office 3,064,505
Patented Nov. 20, 1962

3,064,505
POSITIONING TABLE
Paul Pierce, Jr., La Grange, Ill., assignor to Pierce Wrapping Machine Co., La Grange Park, Ill., a corporation of Illinois
Filed Aug. 4, 1961, Ser. No. 129,396
7 Claims. (Cl. 77—63)

This invention relates to a positioning table, and, more particularly, to a work-supporting table or platform to be used in conjunction with a drill press, or similar working member.

In drilling operations, particularly with heavy work elements, there is a problem of stable alignment. It will be appreciated that in precision drilling, the work must be carefully centered and, once centered or aligned, maintained in a predetermined position. Positionable work holders in the past have imperfectly achieved this. One critical drawback lay in the immobilization techniques. The very step of locking the table or workpiece in a given position often resulted in a slight, but undesirable, misalignment. The attempts to overcome this and other drawbacks have resulted in increasingly complex positioning structures, with the attendant opportunity for even greater error or malfunction.

It is, therefore, an important object of this invention to provide a positioning table which overcomes these drawbacks—more particularly, a table characterized by simplicity, yet ruggedness of construction, and one which serves the important objective of immobilizing a workpiece without misalignment.

Another object is to provide a positioning table which yields two degrees of movement of a workpiece position thereon, freely when unlocked, yet which is capable of substantial immobilization over a wide range of positions;

Other objects and advantages of this invention may be seen in the details of construction and operation set down in this specification.

The invention will be explained in conjunction with the accompanying drawing, in which—

FIG. 1 is a fragmentary perspective view of the positioning table of the invention shown in a particular operating environment, i.e., associated with a drill press;

FIG. 2 is a vertical sectional view through the worktable seen in FIG. 1 and in enlarged scale relative thereto;

FIG. 3 is a view similar to FIG. 2 but taken at a right angle thereto;

FIG. 4 is a perspective view, partially in section, of a bladder element employed in the inventive construction;

FIG. 5 is a sectional view through a bladder element-equipped section of the apparatus;

FIG. 6 is a fragmentary sectional view taken along the line 6—6 of FIG. 5; and

FIG. 7 is a diagram of the piping and inflatable elements associated with the worktable seen in FIGS. 1 and 2.

In the illustration given, and with particular reference to FIG. 1, the numeral 10 designates generally a drill press which is equipped with a conventional standard 11 and elevatable drill holder or spindle 12, the latter carrying a bit or drill 13. The drill press 10 shown is of conventional construction and is illustrated herein merely for the sake of showing an operative environment for the invention.

The press 10 is equipped with a frame generally designated 14, which may be conveniently affixed to the press 10 or provided with a separate pedestal, as desired. The frame 14, on its top surface, is conveniently equipped with work holders 15 securing a piece 16 to be worked. The instant invention is concerned with the means interposed between the work holders 15 and the frame 14 and which are employed for movement of the workpiece 16 as, for example, to position an opening 17 in the workpiece 16 directly under the bit 13. Quick and easy removal of the workpiece 16 from under the bit 13 is advantageous for a number of purposes. For example, the shank of the bit 13 may be of such length as to preclude removal of the bit 13 if there is any workpiece thereunder. This necessarily requires a translatory movement of the workpiece 16 to afford this removal. In other instances, it may be necessary to drill a plurality of holes in a workpiece 16, which, of course, requires horizontally repositioning the workpiece 16 a number of times.

This translatory movement is achieved through the use of a first platform designated P which moves in the direction of the arrows fixed to the symbol P in FIG. 1. The movement of piece 16 crosswise relative to the movement of table P is achieved by a second table P', likewise equipped with arrows.

Referring now to FIG. 2, it is seen that the frame 14 is equipped with a plurality of upstanding, elongated bosses or flanges 18. The flanges 18 are equipped with finished top surfaces 19 which serve to support the first platform P. The platform P is equipped with a similar number of depending bosses 20 (three illustrated), having finished surfaces on the bottoms thereof which are adapted to come in contact with the flanges 18.

On the central bottom thereof, the first platform P is equipped with a longitudinally-extending, depending leg-like member 21, to which is affixed a horizontally-extending bar 22 as by bolts 22a. Here, it is to be appreciated that the term "longitudinal" will be used with reference to the direction of platform movement, since the platform itself may be square or otherwise dimensioned so as to render the term "longitudinal" not precisely meaningful as compared to a length dimension. The frame 14 is equipped with upwardly-extending projections 23 and 24 which bracket or confine the bar 22 and thus serve as a guide or way for directing the first platform P in its unidirectional movement.

The projection or abutment 23 is equipped with a horizontally-extending bar 25 which, as can be appreciated from FIG. 2, is essentially offset and elevated relative to the bar 22 of the first platform P.

Postitioned within the elongated, generally rectangular pocket defined by the depending leg 21, the bar 22, the abutment 23, and the bar 25 (the pocket or chamber being designated 26), is a resilient inflatable element 27. The elements 21—27 provide a desirable support and locking mechanism generally designated L, as will be brought out more in detail hereinafter. Reference to FIG. 7 shows that the inflatable element or bladder 27 is positioned centrally relative to the groups generally designated 28 and 29 which are also inflatable elements and which are seen at the left and right of the element 27. The element 27, when inflated, urges the first platform P downwardly into engagment with the frame 14, thereby immobilizing the platform P against movement in a direction along the length of the element 27. Movement of the table or first platform P sidewardly of the length of the element 27 is precluded not only by the cooperation of the abutments 23 and 24 in combination with the bar 22, but also by the substantial weight of the first platform P and the fact that the depending bosses 20 mate with the flanges 18.

Movement of the platform P in directions parallel with the length of the element 27 is achieved by elevating the platform P relative to the frame 14, and, for this purpose, the groups of inflatable elements 28 and 29 are employed. As seen in FIG. 2, one element 28a is positioned within an elongated recess 30 defined by upstanding portions 31 and 32 provided integrally with the frame 14. The recess or chamber 30 also has positioned therein and above the pair of elongated elements 28, a bar 33 which supports a roller bearing assembly generally designated 34 provided on the undersurface of platform P. The bar 33 is confined against upward outward movement from the recess 30 by means of clips 35 (see especially FIG. 5) bolted to the portions 31 and 32 by means of bolts 35a.

Supporting the roller bearing 34 is a channel shaped member 36 depending from the platform P, and it will be apparent that when the inflatable element or bladder group 28 is inflated, the bar 33 is urged upwardly to come into contact with bearings 34 and lift the member 36 out of contact with the clips 35. Simultaneously with the inflation of the elements 28 and 29, the element 27 is collapsed, which unlocks the first platform P relative to the frame 14, permitting movement of the first platform P in a direction parallel with the length of the inflatable elements positioned between the first platform P and the frame 14. It will be appreciated that the arrangement of elements 29 is similar to that of the elements 28, and, as seen from FIG. 7, these elements are inflated or deflated, as the case may be, simultaneously.

In FIG. 7, the numeral 37 designates generally a foot pedal actuator of conventional design which is coupled to a compressed air supply line 38. The input air line 38 is equipped with the usual reducing valve 39 and relief valve 40. Leading from the foot pedal actuator 37 is a so-called "elevating" air line 41. Depression of the pedal portion 37a communicates the line 38 with the line 41 so as to supply air to the groups 28 and 29. Simultaneously, the second line 42 connected to the actuator 37 is vented to the atmosphere, this line also being coupled to the "locking" bladder 27. Release of the pedal portion 37a results in the opposite operation wherein the line 42 is coupled to the supply line 38 and the line 41 is vented as at 43. The bladder 27 can travel with the platform P, and, for this purpose, is equipped with flexible piping as at 27a in FIG. 7.

The second degree of movement is provided by means of a second platform generally designated P' and which is operative to move in a direction essentially perpendicular to that of the direction of free movement of the first platform P. The arrangement of intersecting elements between the first and second platforms P and P', respectively, approximates the elements interposed between the first platform P and the subframe 14—as can be seen in FIG. 3.

In FIG. 3, similar numerals designate like elements but with the addition of "100." Thus, it can be seen that the second plaform P' is equipped with a plurality of depending legs or bosses 120, the bottom finished surfaces of which are adapted to be carried by the upwardly-extending flanges or surfaces 118. A similar arrangement of locking elements is provided in the central portion which includes an inflatable element 127 housed within a recess 126 defined by abutments 121 and 123 equipped, respectively, with bars 122 and 125. A projection 124 cooperates with the abutment 123 in confining the bar 122 when the upper platform 43 is moved in a direction parallel to the length of inflatable element 127, the elements 121—127 providing a second supporting and locking mechanism L'.

Elevation of the platform P' relative to the platform P is achieved through groups of inflatable elements 128 and 129. These elements are confined within recesses 130 provided as part of the platform P (in contrast to the recesses 30 provided as part of the frame 14). Also positioned within the chamber recess 130 is a bar 133 (analogous to the bar 33) which slidably supports a roller bearing assembly 134. The assembly 134, as before, is mounted in a channel 136 movable out of supporting relation with the clips 135 secured in place by bolts 135a. The clips 135, analogous to the construction set down heretofore relative to frame 14, are secured to the depending portions 131 and 132.

In operation, the artisan initially secures a workpiece 16 within the holders 15, which can be conveniently located atop the upper platform P' as in special ways W. Thereafter, he merely depresses the pedal actuator 37, which introduces air into the bladders 28, 29, 128 and 129 and releases air from the bladders 27 and 127. This operation results in the table P being raised relative to the frame 14 and the upper platform or table P' being raised relative to the intermediate platform P, whereupon both platforms are supported on their associated rollers rather than on the normal supports provided by elements 18 and 20, or 118 and 120, and the central structures L and L'. Because the roller bearings 34 and 134 are arranged at right angles to each other, any type of horizontal movement of the workpiece 16 can be achieved— as will be appreciated by having the desired movement resolved into its two rectilinear components. Moving the table P is achieved by sidewise force, with the rollers 34 sliding in the elongated tracks defined by the clips 35 and bars 33. After the workpiece 16 has been located in a desired position, pedal pressure is released from the actuator 37, whereupon the elevating elements 28, 29, 128 and 129 are collapsed and the locking elements 27 and 127 are reinflated. It will be appreciated that the essential immobilization of the platforms P and P' relative to the frame 14 is achieved through the weight of the two tables and that the inflatable elements 27 and 127 serve as a further guarantee of immobilization. In some instances, therefore, it might be advantageous to eliminate the locking bladders 27 and 127. In either event, however, there is a torqueless locking action, since gravity is relied upon for bringing the two platforms P and P' into contact with each other and with the platform P into immobilizing engagement with the frame 14.

Reference to FIG. 1 reveals that each platform P and P', as the case may be, is equipped with a pair of shrouds or cover members 44 and 45, respectively. The shrouds 45 are provided relative to the upper platform P' and extend between opposite edges of that platform and side edges of the lower platform P. These shrouds 45 in effect cover the ways or tracks provided by the clips 35 and bars 33 to prevent debris from the workpiece from falling therein and possibly fouling the operation of the apparatus. As seen, the shrouds 45 are pleated or accordion-like members to provide an extensible operation, permitting movement of the platform P' in a direction perpendicular to the length of the flutes in the accordion-like shroud 45.

In like fashion, the lower platform P is equipped with shrouds 44, which extend between the opposite edges extending perpendicular to the direction of movement of that platform and an edge of the frame 14. The effect of debris can be minimized somewhat by reversing the positions of the rollers 34 and bars 33, in which case the fluid tubes will travel with the various platforms.

Excellent results in the operation of the apparatus are achieved with inflatable elements constructed of rubber and wherein the rubber has a generally rectangular or oval cross section, as seen in FIG. 5. This results in minimal distortion of the bladder in bringing about maximum application of pressure between the confining elements, i.e., the tables P and P', or the table P and the frame 14. The illustrated shape also means that minimum space is occupied where space is at a premium. It will be appreciated that the degree of inflation is relatively minor, the bladders inflating about 1/16" over their non-inflated form, which results in a movement of the tables relative to each other and relative to the frame of about 0.01". The side clearances, as between the bars 22 and 122 confining the channel developed by elements 23 and 24 or 123 and 124, are of the order of 0.004″, which is suitable clearance for the sliding operation contemplated. Longitudinal movement of the bladders is precluded by the provision of depending, welded-on clips 33a (see FIG. 6) which serve to confine the bladder 28a in the chamber 30. Longitudinal movement of the U-shaped bars 33 is restricted by endplates 14a, again see FIG. 6.

Through the invention, it is possible to completely move the table out from under the drill press spindle 12, thereby facilitating operations on heavy workpieces of the order of 500 pounds weight or more, which now can only be conveniently handled through an overhead lift or crane. It will also be appreciated that the shrouds act as stops, but, where desired, supplemental abutments can be provided as by blocking the end of the track provided by bar 33—as at 33 in FIG. 3.

In the illustration given, the apparatus can be conveniently operated through the use of compressed air—with the pressures ordinarily encountered in machine shops, i.e., 40 p.s.i. Compressed air is usually available when drilling operations are contemplated, since the air is used for blowing away chips, dust, etc. It will be appreciated, however, that where a compressor is either unavailable or undesirable, other pressure fluids, oils, water, etc. may be employed to develop the necessary lifting pressure. Here the bladders confine the air while themselves being confined, and with a minimum of machined surfaces while providing a completely versatile operation.

The invention provides for another type of novel operation in that the positioning table, when in its "floating" condition, does permit free lateral movement deemed desirable as in a tapping operation wherein the tapping element performs its own centering function. Here, the operator may first use a drill bit to establish the hole and thereafter provide a tap on the spindle 12. He lowers the spindle 12 while depressing the actuator 37, thereby causing the tap to center the workpiece 16. This occurs substantially instantaneously, after which the actuator 37 may be returned to nondepressed condition. In this fashion, the need for the conventional and expensive floating tap holder is eliminated.

While, in the foregoing specification, I have set down a detailed description of an embodiment of the invention for the purpose of explanation thereof, many variations in the details herein given will be seen by those skilled in the art without departing from the spirit and scope of the invention.

I claim:

1. A positioning table, comprising a frame, said frame being equipped with an upper surface for the mounting thereon of a first platform, a plurality of elongated guides in said surface, each of said guides comprising a channel-shaped track, an elongated resilient bladder having a generally oval cross section in each channel-shaped track, an elongated bar in each channel track above said bladder, depending legs on the ends of said elongated bar cooperating with said channel track in providing a confining chamber for said bladder, a first platform positioned above said surface and equipped with a plurality of depending rollers, said rollers being arranged to engage said elongated bars, a projecting abutment on said surface and a depending projecting abutment on the side of said platform confronting said surface, said abutments cooperating to define a bladder-receiving chamber, a bladder mounted in said bladder-receiving chamber, means for selectively inflating said bladders, whereby the bladder in said bladder-receiving chamber is effective upon a given selection to interlock said first platform and frame, while the bladders in said channel-shaped tracks are collapsed, said bladder in said bladder-receiving chamber, upon an alternate selection, being collapsible with the bladders associated with said channel tracks being inflatable to urge said elongated bars into contact with said rollers and elevate said first platform for unidirectional movement parallel to the length of said elongated bars, a second platform positioned above said first platform, and bladder and track means interposed between said first and second platforms to provide for unidirectional movement of said second platform in a direction perpendicular to the movement direction of said first platform.

2. A positioning table, comprising a frame, said frame being equipped with an upper surface for the mounting thereon of a first platform, a plurality of elongated guides in said surface, each of said guides comprising a channel-shaped track, an elongated resilient bladder having a generally oval cross section in each channel-shaped track, an elongated bar in each channel track above said bladder, depending legs on the ends of said elongated bar cooperating with said channel track in providing a confining chamber for said bladder, a first platform positioned above said surface and equipped with a plurality of depending rollers, said rollers being arranged to engage said elongated bars, a projecting abutment on said surface and a depending projecting element on the side of said platform confronting said surface, said abutments cooperating to define a bladder-receiving chamber, a bladder mounted in said bladder-receiving chamber, means for selectively inflating said bladders, whereby the bladder in said bladder-receiving chamber is effective upon a given selection to interlock said first platform and frame, while the bladders in said channel-shaped tracks are collapsed, said bladder in said bladder-receiving chamber, upon an alternate selection, being collapsible with the bladders associated with said channel tracks being inflatable to urge said elongated bars into contact with said rollers and elevate said first platform for unidirectional movement parallel to the length of said elongated bars, a second platform positioned above said first platform, bladder and track means interposed between said first and second platforms to provide for unidirectional movement of said second platform in a direction perpendicular to the movement direction of said first platform, and shroud means extending between said first and second platforms and between said first platform and frame to prevent debris from work on said second platform from entering said track means, said second platform being equipped with work holder means for the mounting of a workpiece on said second platform.

3. A positioning table, comprising
(A) a frame,
  (i) said frame being equipped with an upper surface for the mounting thereon of a first platform,
  (ii) a plurality of elongated guides in said surface, each of said guides comprising a channel-shaped track,
  (iii) an elongated resilient bladder in each channel-shaped track,
  (iv) an elongated bar in each channel track above said bladder,
(B) a first platform positioned above said surface and equipped with
  (i) a plurality of depending rollers, said rollers being arranged to engage said elongated bars,
  (ii) a projecting abutment on said surface and a depending projecting abutment on the side of said platform confronting said surface abutment,
  (iii) means for inflating said bladders, the bladders being inflatable to urge said elongated bars into contact with said rollers and elevate said first platform to take said abutments out of bearing relation to permit unidirectional movement of said first platform parallel to the length of said elongated bars,
(C) a second platform positioned above said first platform, and bladder and track means interposed between said first and second platforms to provide for unidirectional movement of said second platform in a direction perpendicular to the movement direction of said first platform.

4. A positioning table, comprising
(A) a frame,
  (i) said frame being equipped with an upper surface for the mounting thereon of a first platform,
  (ii) a plurality of elongated guides in said surface, each of said guides comprising a channel-shaped track,
  (iii) an elongated resilient bladder in each channel-shaped track,
  (iv) an elongated bar in each channel track above said bladder,
(B) a first platform positioned above said surface and equipped with
  (i) a plurality of depending rollers, said rollers being arranged to engage said elongated bars,
  (ii) a projecting abutment on said surface and a depending projecting abutment on the side of said platform confronting said surface abutment,
  (iii) means for inflating said bladders, the bladders being inflatable to urge said elongated bars into contact with said rollers and elevate said first platform to take said abutments out of bearing relation to permit unidirectional movement of said first platform parallel to the length of said elongated bars,
(C) a second platform positioned above said first platform, and bladder and track means interposed between said first and second platforms to provide for unidirectional movement of said second platform in a direction perpendicular to the movement direction of said first platform, and shroud means extending between said first and second platforms and between said first platform and frame to prevent debris from work on said second platform from entering said track means, said second platform being equipped with a work holder for the mounting of a work piece on said second platform.

5. A positioning table, comprising
(A) a frame,
  (i) said frame being equipped with an upper surface for the mounting thereon of a first platform,
  (ii) a plurality of elongated guides in said surface, each of said guides comprising a channel-shaped track,
  (iii) an elongated resilient bladder in each channel-shaped track,
  (iv) an elongated bar in each channel track above said bladder,
(B) a first platform positioned above said surface and equipped with
  (i) a plurality of depending rollers, said rollers being arranged to engage said elongated bars,
  (ii) a projecting abutment on said surface and a depending projecting abutment on the side of said platform confronting said surface abutment,
  (iii) said first platform being equipped with an upper surface for the mouting thereon of a second platform,
  (iv) a plurality of elongated guides in said second platform surface, each of said guides comprising a channel-shaped track,
  (v) an elongated resilient bladder in each channel-shaped track of said first platform surface,
  (vi) an elongated bar in each channel track of said first platform surface above said bladder,
(C) a second platform positioned above said first platform surface and equipped with
  (i) a plurality of depending rollers, said rollers being arranged to engage said elongated bars,
  (ii) a projecting abutment on said first platform surface and a depending projecting abutment on the side of said second platform confronting said first platform surface abutment,
  (iii) the length of the elongated guides in said first and second platform surfaces being perpendicular relative to each other, and
(D) means for simultaneously inflating all of said bladders.

6. A positioning table, comprising
(A) a frame,
  (i) said frame equipped with an upper surface for the mounting thereon of a first platform,
  (ii) a plurality of elongated guides in said surface, each of said guides comprising a channel-shaped track,
  (iii) an elongated resilient bladder in each channel-shaped track,
  (iv) an elongated bar in each channel track above said bladder,
(B) a first platform positioned above said surface and equipped with
  (i) a plurality of depending rollers, said rollers being arranged to engage said elongated bars,
  (ii) a projecting abutment on said surface and a depending projecting abutment on the side of said platform confronting said surface abutment, said abutments cooperating to define a bladder-receiving chamber,
  (iii) a bladder mounted in said bladder-receiving chamber,
  (iv) means for selectively inflating said bladders whereby the bladder in said bladder-receiving chamber is effective, upon a given selection, to interlock said first platform and frame, while the bladders in said channel-shaped tracks are collapsed, said bladders in said bladder-receiving chamber, upon an alternate selection, being collapsible, with the bladders associated with said channel tracks being inflatable to urge said elongated bars into contact with said rollers and elevate said first platform for unidirectional movement parallel to the length of said elongated bars, and
(C) a second platform positioned above said first platform, and bladder and track means interposed between said first and second platforms to provide for unidirection movement of said second platform in a direction perpendicular to the movement direction of said first platform.

7. A positioning table, comprising
(A) a frame,
  (i) said frame being equipped with an upper surface for the mounting thereon of a first platform,
  (ii) a plurality of elongated guides in said surface, each of said guides comprising a channel-shaped track,
  (iii) an elongated resilient bladder in each channel-shaped track,
  (iv) an elongated bar in each channel track above said bladder,
(B) a first platform positioned above said surface and equipped with
  (i) a plurality of depending rollers, said rollers being arranged to engage said elongated bars,
  (ii) a projecting abutment on said surface and a depending projecting abutment on the side of said platform confronting said surface abutment, said abutments cooperating to define a bladder-receiving chamber,
  (iii) a bladder mounted in said bladder-receiving chamber,
  (iv) means for selectively inflating said bladders whereby the bladder in said bladder-receiving chamber is effective, upon a given selection, to interlock said first platform and frame, while the bladders in said channel-shaped tracks are collapsed, said bladders in said bladder-receiving chamber, upon an alternate selection, being collapsible, with the bladders associated with said channel tracks being inflatable to urge said elongated bars into contact with said rollers and elevate said first platform for unidirectional movement parallel to the length of said elongated bars, (v) said first platform being equipped with an upper surface for the mounting thereon of a second platform, (vi) said platform being equipped with an upper surface for the mounting thereon of a second platform, a plurality of elongated guides in said first platform surface, each of said guides comprising a channel-shaped track, (vii) an elongated resilient bladder in each channel-shaped track on said first platform surface, (viii) an elongated bar in each first platform surface channel track above its associated bladder, (C) a second platform positioned above said first platform surface and equipped with (i) a plurality of depending rollers, said rollers being arranged to engage said elongated bars, (ii) a projecting abutment on said first platform surface and a depending projecting abutment on the side of said second platform confronting said first platform surface abutment, said abutments cooperating to define a bladder-receiving chamber, (iii) a bladder mounted in said bladder-receiving chamber defined by said first and second platforms, said inflating means being operative to selectively inflate the bladders positioned between said first and second platforms, (iv) the length of the tracks in said first platform surface being at right angles to the length of the tracks in said frame.

References Cited in the file of this patent
UNITED STATES PATENTS

| | | |
|---|---|---|
| 2,827,808 | Charlat | Mar. 25, 1958 |
| 2,934,978 | Estabrook | May 3, 1960 |
| 2,959,988 | Abrams | Nov. 15, 1960 |